(12) United States Patent
Marrs

(10) Patent No.: US 6,859,604 B2
(45) Date of Patent: Feb. 22, 2005

(54) TUNING TOOL FOR TUNABLE FIBER OPTIC CONNECTOR

(75) Inventor: Samuel M. Marrs, Bradley, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/354,388

(22) Filed: Jan. 30, 2003

(65) Prior Publication Data

US 2004/0151464 A1 Aug. 5, 2004

(51) Int. Cl.[7] .............................................. G02B 6/00
(52) U.S. Cl. ............................ 385/134; 385/53; 385/55
(58) Field of Search .............................. 385/134, 53, 55

(56) References Cited

U.S. PATENT DOCUMENTS

| | | | |
|---|---|---|---|
| 4,753,510 A | 6/1988 | Sezerman | 385/61 |
| 4,889,406 A | 12/1989 | Sezerman | 385/35 |
| 5,481,634 A * | 1/1996 | Anderson et al. | 385/76 |
| 6,155,146 A | 12/2000 | Andrews et al. | 81/461 |
| 6,238,101 B1 | 5/2001 | Chen et al. | 385/60 |
| 6,254,278 B1 | 7/2001 | Andrews et al. | 385/53 |
| 6,287,018 B1 | 9/2001 | Andrews et al. | 385/60 |
| 6,464,402 B1 * | 10/2002 | Andrews et al. | 385/53 |
| 6,524,014 B2 * | 2/2003 | Stephenson et al. | 385/55 |

* cited by examiner

Primary Examiner—Michael G. Lee
Assistant Examiner—Seung H Lee
(74) Attorney, Agent, or Firm—Robert A. McCann; Christopher S. Clancy

(57) ABSTRACT

A tuning tool for tuning a fiber optic connector is disclosed. The tuning tool includes an outer housing, a first plug tuning disk, an inner housing received within the outer housing, a second plug tuning disk received within the inner housing, and a split sleeve. The first and second plug tuning disks each have an adapter extending therefrom, and the split sleeve is receivable within the first and second adapters for receiving a first ferrule and a second ferrule, respectively. A method of tuning a fiber optic connector is also disclosed.

16 Claims, 12 Drawing Sheets

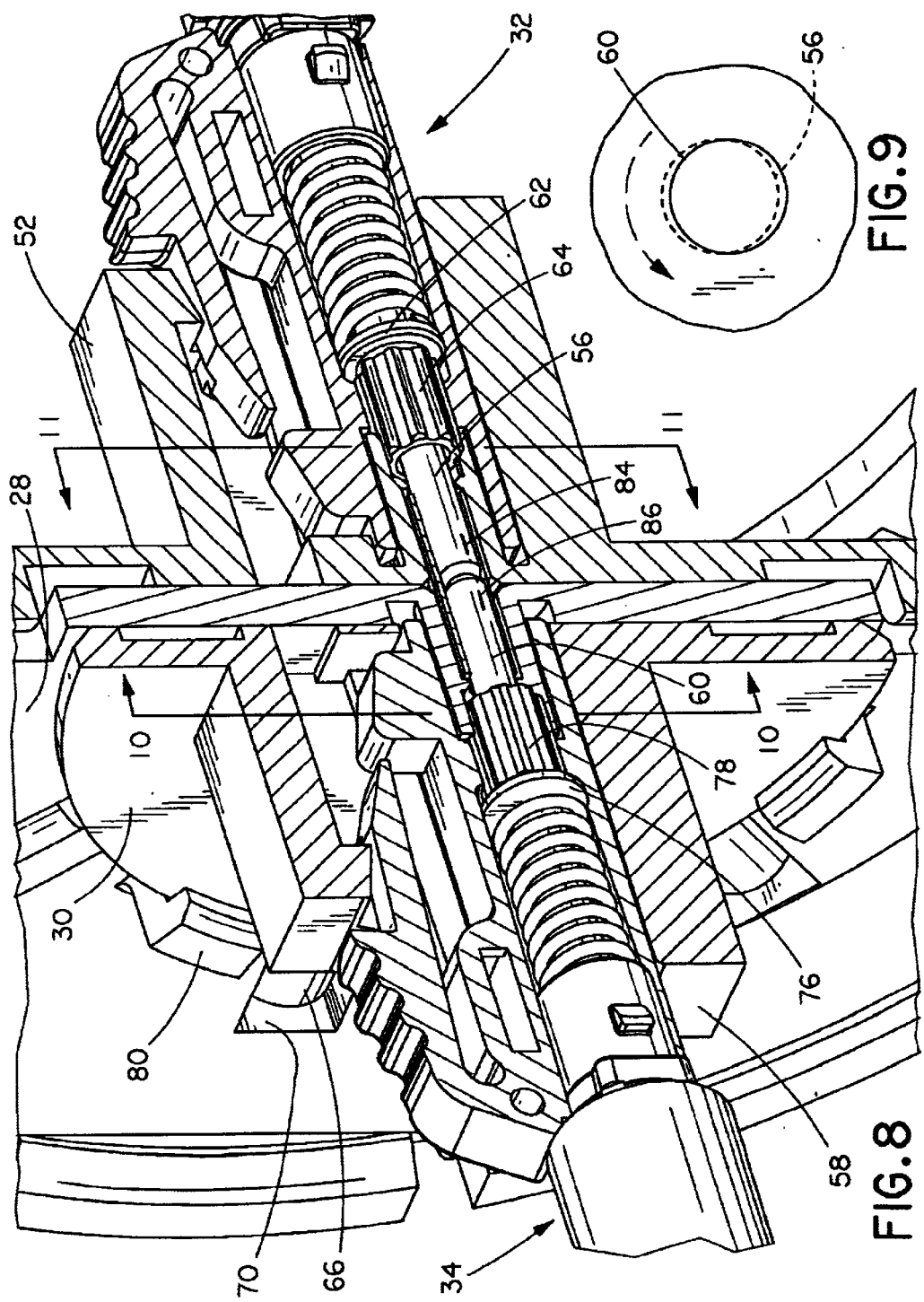

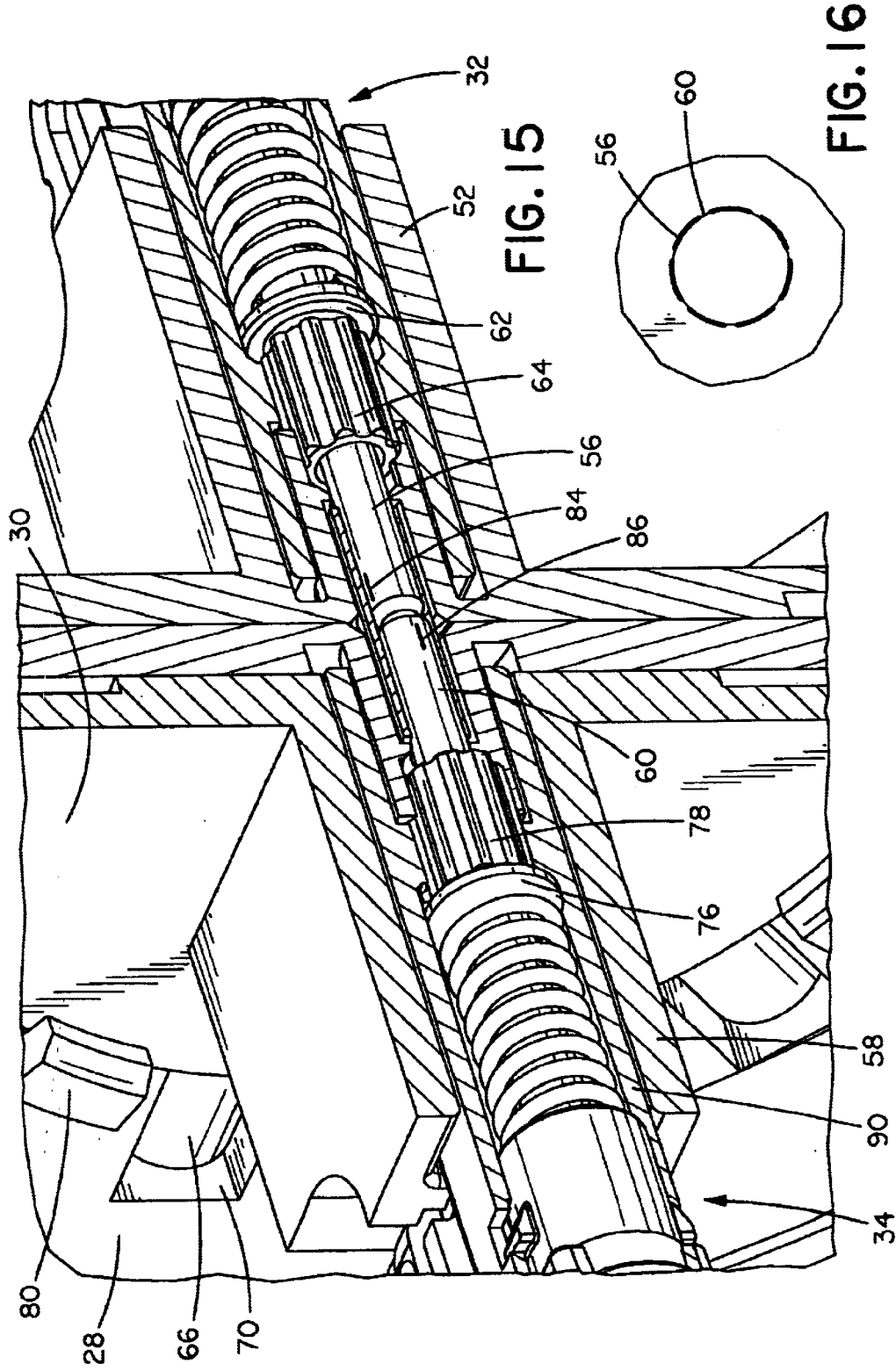

TUNING TOOL FOR TUNABLE FIBER OPTIC CONNECTOR

CROSS-REFERENCE TO RELATED APPLICATIONS

This application is related to U.S. patent application Ser. No. 10/354,273, filed concurrently herewith.

BACKGROUND OF THE INVENTION

The present invention is directed to a fiber optic connector and, more particularly, to a tuning tool for tuning a fiber optic connector.

Tuning tools for tuning fiber optic connectors are known in the telecommunications industry. One such tuning tool is disclosed in U.S. Pat. No. 6,287,018, assigned to Lucent Technologies. The '018 patent discloses a tuning index tool and a tuning wrench combination for tuning an LC type connector. The '018 patent teaches that once the least insertion loss incremental position of the mated connector pair is determined, the connector to be tuned is removed from the tuning tool, and a tuning wrench is then used to push the ferrule inside the connector to disengage the alignment system and rotate the ferrule of the connector clockwise or counterclockwise to "tune" the connector. However, none of the prior art tuning tools, including the one disclosed in the '018 patent, provide a tuning tool for tuning a fiber optic connector having the ability to tune a mated connector pair to each other without having to remove the connector pair from the tuning tool, without having to utilize a separate tool to finish tuning the mated connector pair, or without having to disengage the alignment system.

It would be desirable to provide a tuning tool for tuning a fiber optic connector having the ability to tune a mated connector pair to each other without having to remove the connector pair from the tuning tool.

It would also be desirable to provide a tuning tool for tuning a fiber optic connector having the ability to tune a mated connector pair to each other without having to utilize a separate tool to finish tuning the mated connector pair.

It would further be desirable to provide a tuning tool for tuning a fiber optic connector having the ability to tune a mated connector pair to each other without having to disengage the alignment system.

SUMMARY OF THE INVENTION

A tuning tool for tuning a fiber optic connector is disclosed. The tuning tool has an outer housing, a first plug tuning disk, an inner housing received within the outer housing, a second plug tuning disk received within the inner housing, and a split sleeve. The first and second plug tuning disks each have an adapter extending therefrom, and the split sleeve is receivable within the first and second adapters for receiving a first ferrule and a second ferrule, respectively.

Preferably, the outer housing has an aperture therein and four snap latches for engaging four pockets on the inner housing. Upon engagement of the snap latches in the pockets, the first plug tuning disk and the inner housing are fixed in the same orientation, and the inner housing is keyed to the outer housing. The outer housing also has four spring latches, with each spring latch having two relieves for allowing the snap latches to flex and lock into the pockets. Moreover, the outer housing has at least three spring fingers for applying a force to facilitate engagement of the first plug tuning disk with the inner housing.

Preferably, the first plug tuning disk has a first spline socket and a first adapter extending from a first side thereof. The first spline socket receives a first ferrule holder when a first connector is mated in the first adapter, and the first spline socket maintains the orientation of the first ferrule holder in the first adapter during tuning. The first adapter extends through the aperture in the outer housing to receive the first connector therein. Moreover, the first plug tuning disk has eight detent ribs for engaging eight detent pockets in the inner housing and, thus, allows rotation of the first and second connectors at 45° increments to determine their optimal alignment position.

Preferably, the inner housing has a second spline socket extending from a first side thereof. The second spline socket receives a second ferrule holder when the second connector is mated in the second adapter, and the inner housing maintains the orientation of the second ferrule holder in the second adapter during tuning. Moreover, the inner housing has four snap latches for securing the second plug tuning disk to the inner housing.

BRIEF DESCRIPTION OF FIGURES

FIG. 8 is a partial cross-sectional view of the tuning tool of FIG. 3;

FIG. 9 is a schematic view of the tuning tool of FIG. 3, showing alignment of the optical fiber cores in a reference position prior to tuning;

FIG. 15 is a partial cross-sectional view of the tuning tool of FIG. 3, after a second adapter is rotated counterclockwise to align with the first adapter; and FIG. 16 is a schematic view of the tuning tool of FIG. 3, showing alignment of the optical fiber cores after tuning.

DETAILED DESCRIPTION OF PREFERRED EMBODIMENTS

The illustrated embodiments of the invention are directed to a tuning tool for tuning a fiber optic connector having the ability to tune a mated connector pair to each other without having to remove the connector pair from the tuning tool, without having to utilize a separate tool to finish tuning the mated connector pair, or without having to disengage the alignment system.

Figure 1:
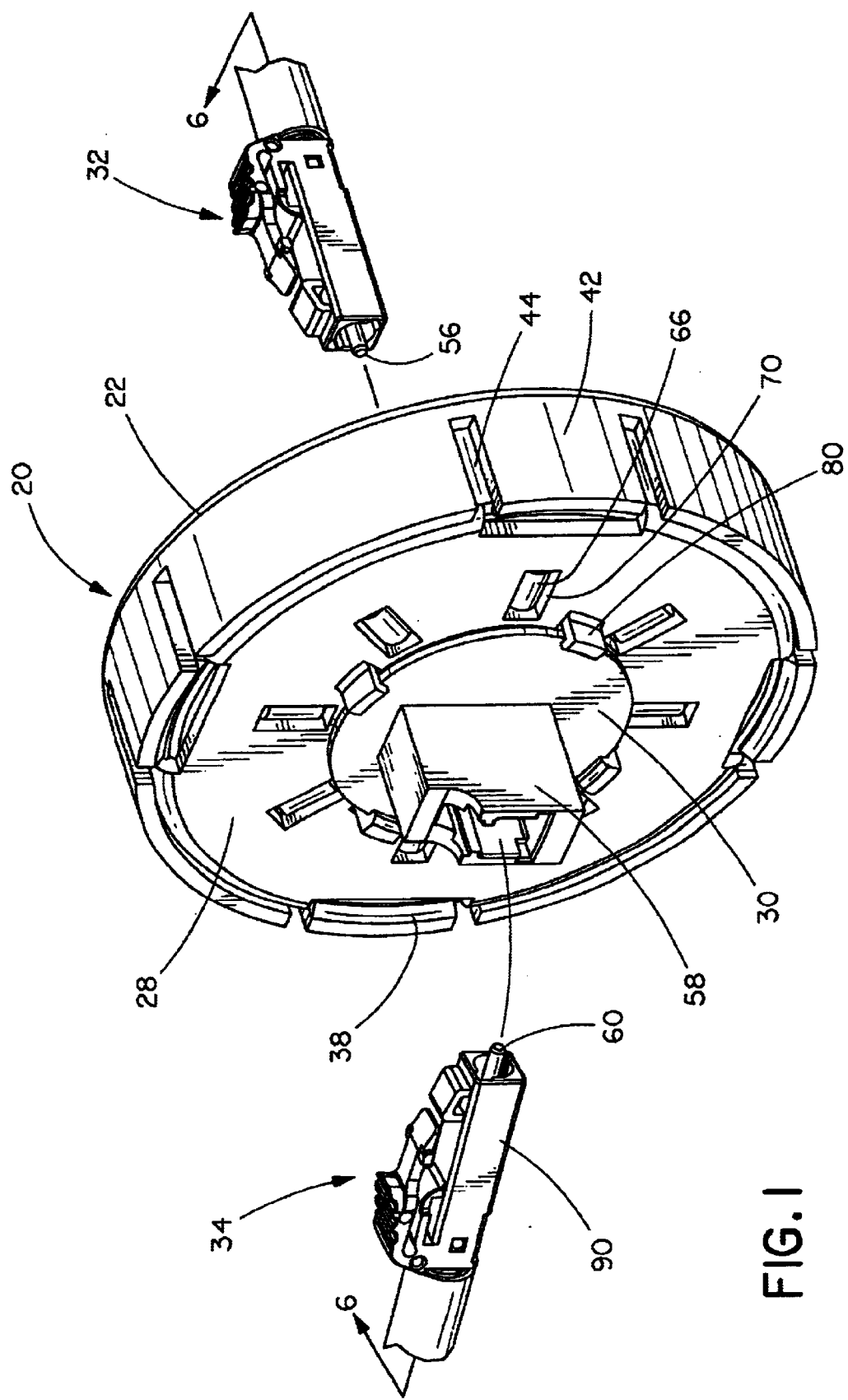
FIG. 1 is a front perspective view of a tuning tool according to the present invention, before two connectors have been inserted into the tuning tool.

FIG. 1 shows a tuning tool 20 for tuning a LC type connector, such as the tunable fiber optic connector disclosed in U.S. patent application Ser. No. 10/354,273, the disclosure of which is incorporated by reference. It is likewise contemplated that the principles of this invention are also applicable to other types of connectors, such as an ST, SC, FC or FJ type connector.

Figure 2:
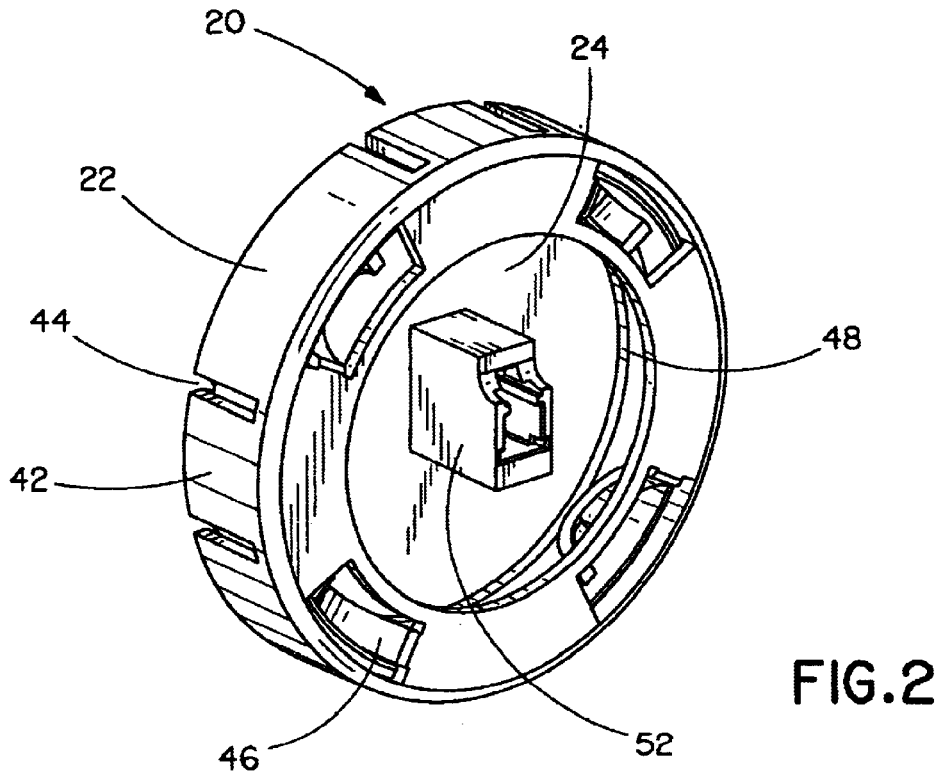
FIG. 2 is a rear perspective view of the tuning tool of FIG. 1.
Figure 3:
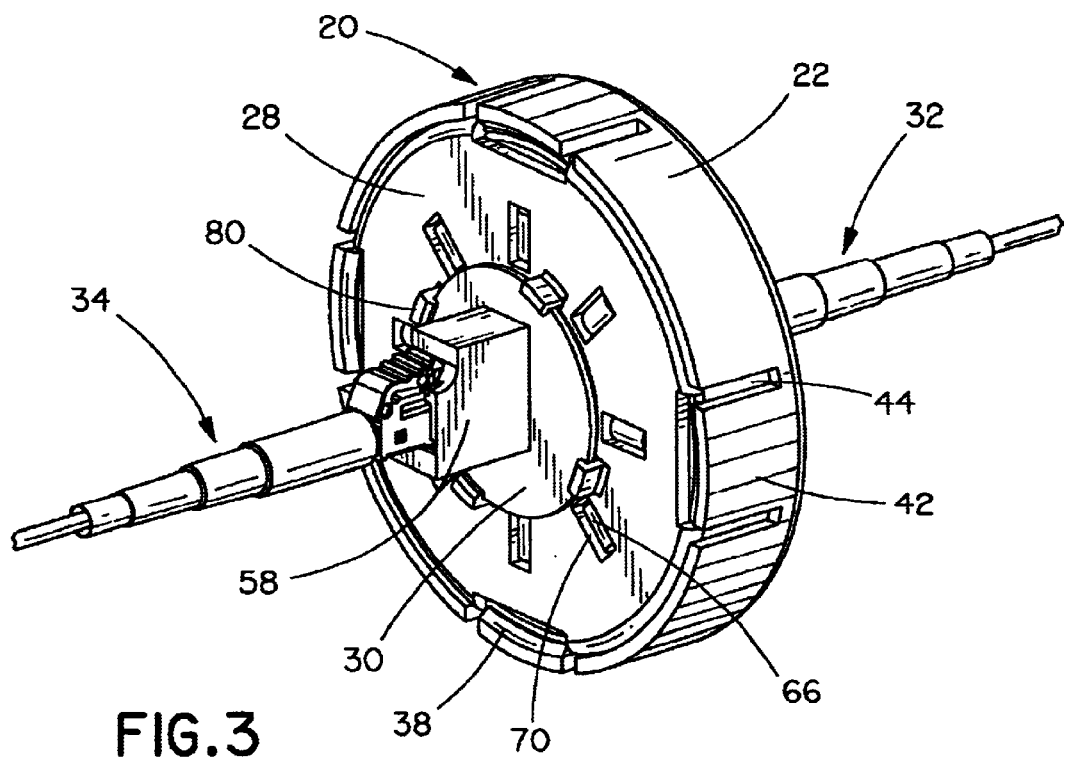
FIG. 3 is a front perspective view of the tuning tool of FIG. 1, after two connectors have been inserted into the tuning tool.

As shown in FIGS. 1–5, the tuning tool 20 includes an outer housing 22, a first plug tuning disk 24, a split sleeve 26, an inner housing 28 and a second plug tuning disk 30. FIG. 1 shows the tuning tool 20 before insertion of a first connector 32 and a second connector 34 therein, and FIG. 2 shows a rear view of the tuning tool 20. FIG. 3 shows a perspective view of the tuning tool 20 after the first connector 32 and the second connector 34 have been inserted therein.

Figure 4:
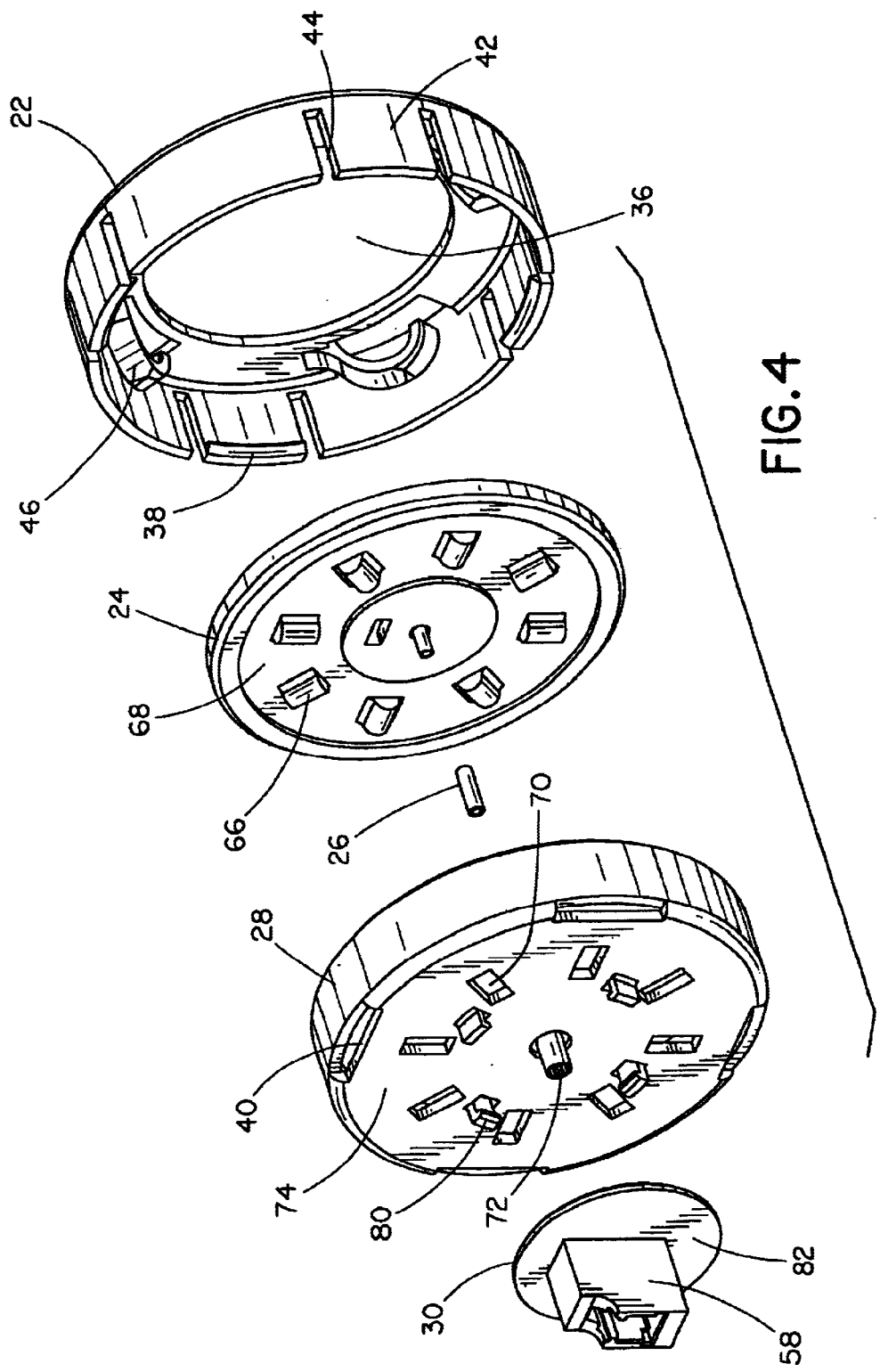
FIG. 4 is a front exploded view of the tuning tool of FIG. 1.
Figure 5:
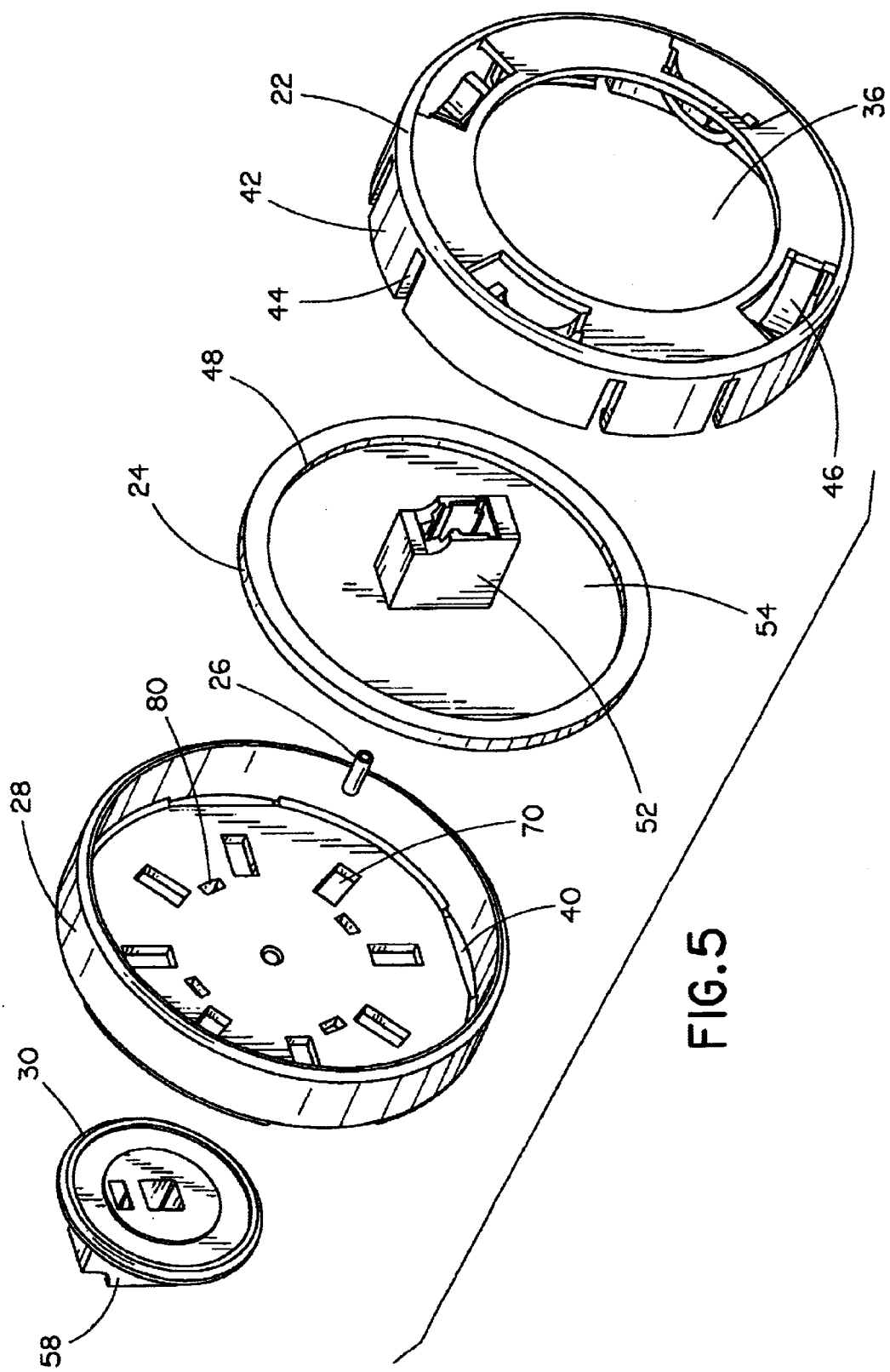
FIG. 5 is a rear exploded view of the tuning tool of FIG. 1.

As shown in FIGS. 4 and 5, the outer housing 22 has an aperture 36 therein. The outer housing 22 has four snap latches 38 for engaging four pockets 40 on the inner housing 28. Upon engagement of the snap latches 38 in the pockets 40, the first plug tuning disk 24 and the inner housing 28 are fixed in the same orientation. Moreover, the inner housing 28 is keyed to the outer housing 22.

As best seen in FIG. 4, the outer housing 22 also has four spring latches 42, with each spring latch 42 having two relieves 44 for allowing the snap latches 38 to flex and lock into the pockets 40 in the inner housing 28. As best seen in FIG. 5, the outer housing 22 further includes four spring fingers 46. Upon assembly of the tuning tool 20, the spring fingers 46 apply force to keep the first plug tuning disk 24 engaged with the inner housing 28.

Figure 6:
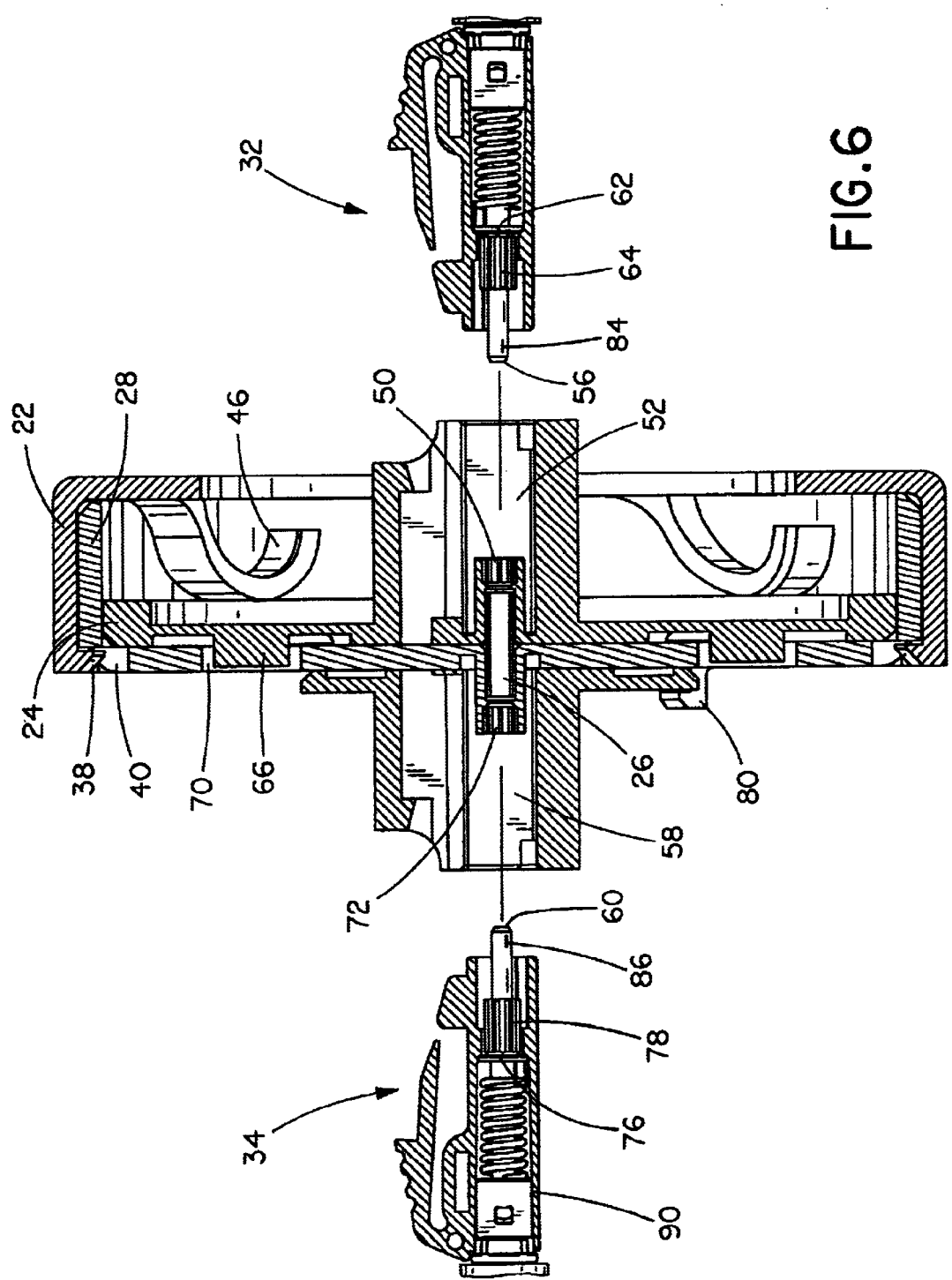
FIG. 6 is a cross-sectional view taken along lines 6—6 of FIG. 1.
Figure 7:
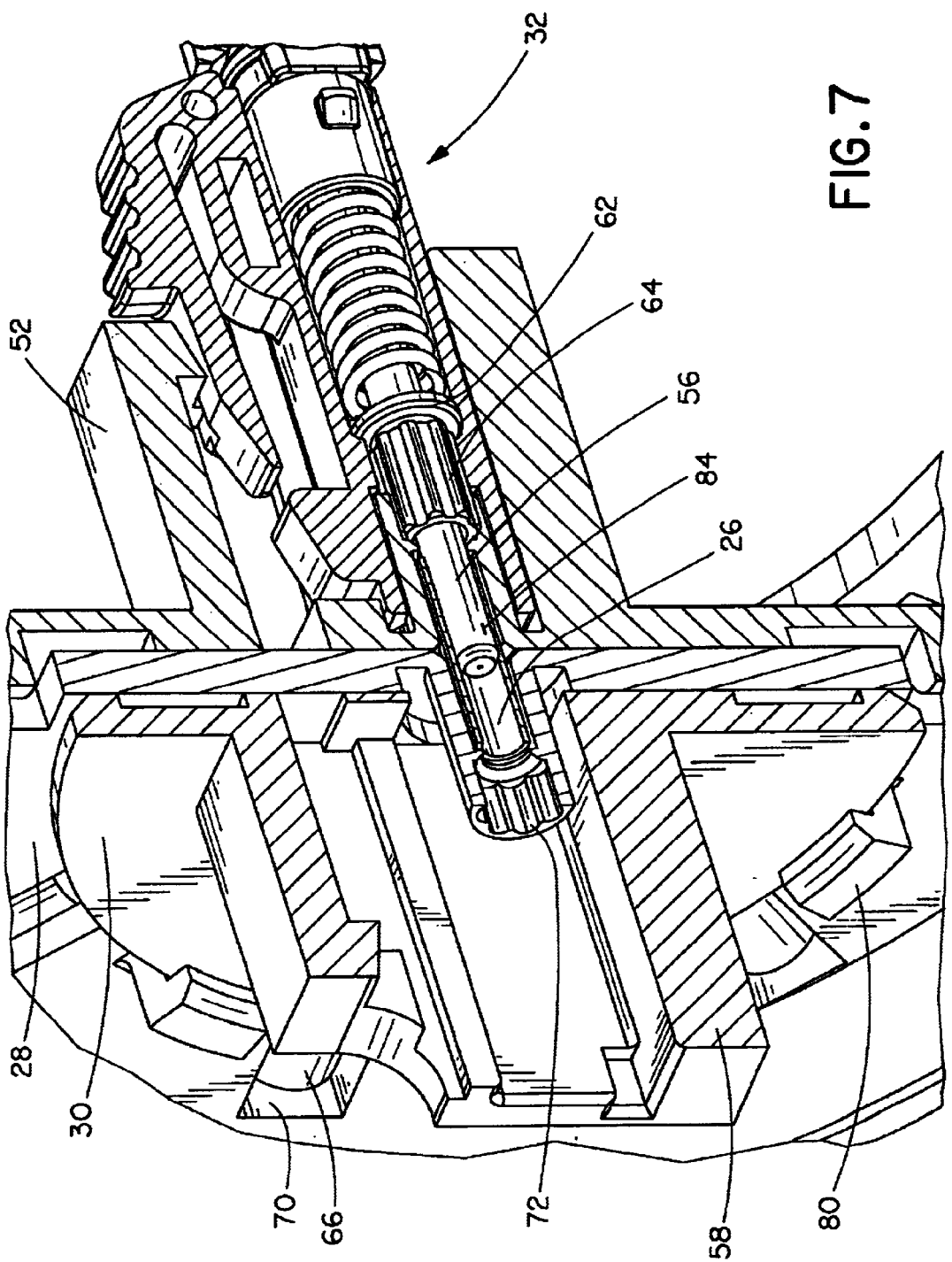
FIG. 7 is a partial cross-sectional view of the tuning tool of FIG. 1, after a first connector is inserted.

As best seen in FIG. 5, the first plug tuning disk 24 has a rim face 48 for slidingly engaging the spring fingers 46 of the outer housing 22, upon assembly of the tuning tool 20. As shown in FIG. 6, the first plug tuning disk 24 has a first spline socket 50 and a first adapter 52 extending from a first side 54 thereof. The first adapter 52 extends through the aperture 36 in the outer housing 22 and receives a first ferrule 56 of the first connector 32 therein. Moreover, as shown in FIG. 7, upon insertion of the first connector 32 into the first adapter 52, the first ferrule 56 overtravels the midpoint of the split sleeve 26 and occupies more than half the total length of the split sleeve 26. However, as shown in FIG. 8, upon insertion of the second connector 34 into a second adapter 58, a second ferrule 60 engages the first ferrule 56 and pushes the first ferrule 56 back to a position occupying approximately half the total length of the split sleeve 26.

As best seen in FIGS. 6–8, the first spline socket 50 receives a first ferrule holder 62 having eight splines 64 spaced 45° apart around the periphery thereof. The first spline socket 50 matches the orientation of the first ferrule holder splines 64 and, thus, maintains the orientation of the first ferrule holder 62 in the first adapter 52 during the tuning process. As best seen in FIG. 4, the first plug tuning disk 24 has eight detent ribs 66 extending from a second side 68 thereof. The detent ribs 66 engage eight detent pockets 70 in the inner housing 28 to facilitate the tuning process. As shown in FIG. 4, the detent pockets 70 and the detent ribs 66 are spaced 45° apart to allow rotating the first and second connectors 32, 34 at 45° increments to determine their optimal alignment position.

As shown in FIG. 4, the inner housing 28 has a second spline socket 72 extending from a first side 74 thereof. Upon assembly of the tuning tool 20 and insertion of the first and second connectors 32, 34, the second spline socket 72 engages a second ferrule holder 76 having eight splines 78 spaced 45° apart around the periphery thereof, as shown in FIG. 8. The, second spline socket 72 matches the orientation of the second ferrule holder splines 78 and, thus, the inner housing 28 maintains the orientation of the second ferrule holder 76 in the second adapter 58 during the tuning process.

As shown in FIG. 3, the second plug tuning disk 30 is received within the first side 74 of the inner housing 28, and four snap latches 80 secure the second plug tuning disk 30 to the inner housing 28. The second plug tuning disk 30 can freely rotate within the snap latches 80. Moreover, the second plug tuning disk 30 has a second adapter 58 extending from a first side 82 thereof to receive the second ferrule 60 of the second connector 34 therein during the tuning process.

In operation, the first connector 32 is positioned in the first adapter 52, as shown in FIG. 7, and the second connector 34 is positioned in the second adapter 58, as shown in FIG. 8, to create a mated connector pair inside the tuning tool 20. As shown in FIG. 8, the first and second ferrules 56, 60 have marks 84, 86 respectively, to indicate the reference position. The user measures the insertion loss of the mated connector pair at the reference position. For purposes of illustration, the reference position is not the optimal alignment position. Accordingly, and as shown in FIG. 9, the optical fiber cores of the first and second ferrules 56, 60 are offset.

Figure 11:
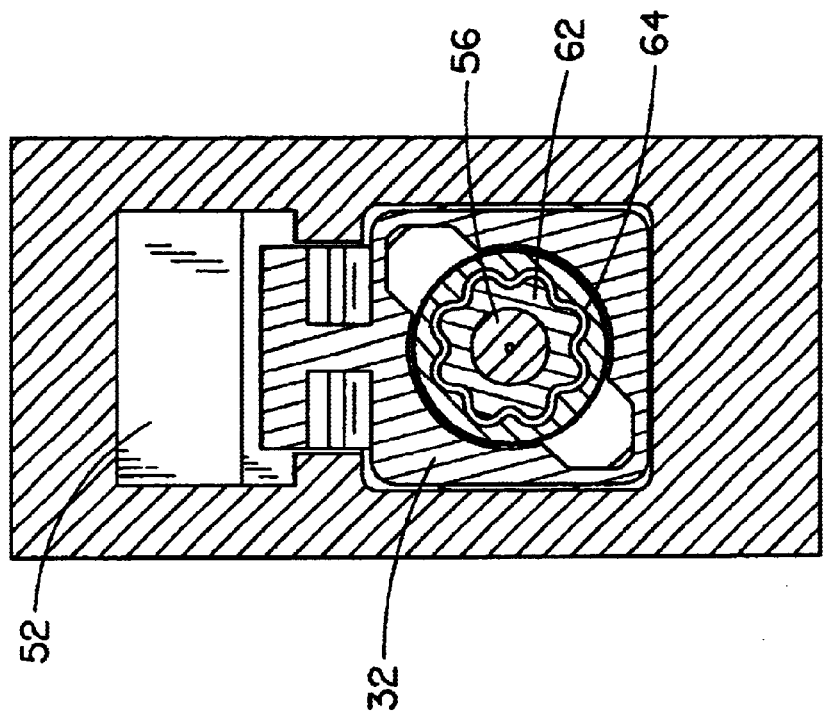
FIG. 11 is a cross-sectional view taken along lines 11—11 of FIG. 8.
Figure 10:
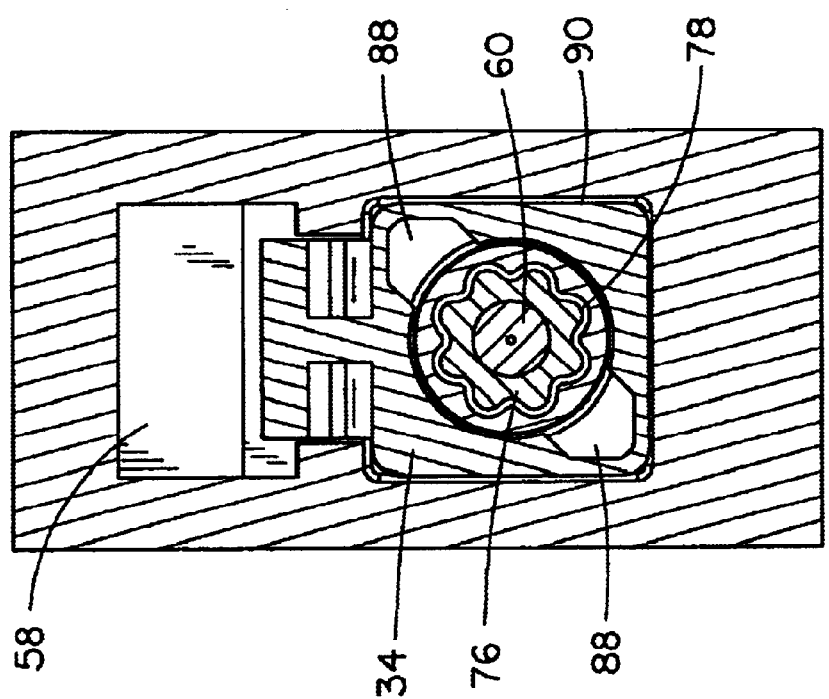
FIG. 10 is a cross-sectional view taken along lines 10—10 of FIG. 8.
Figure 12:
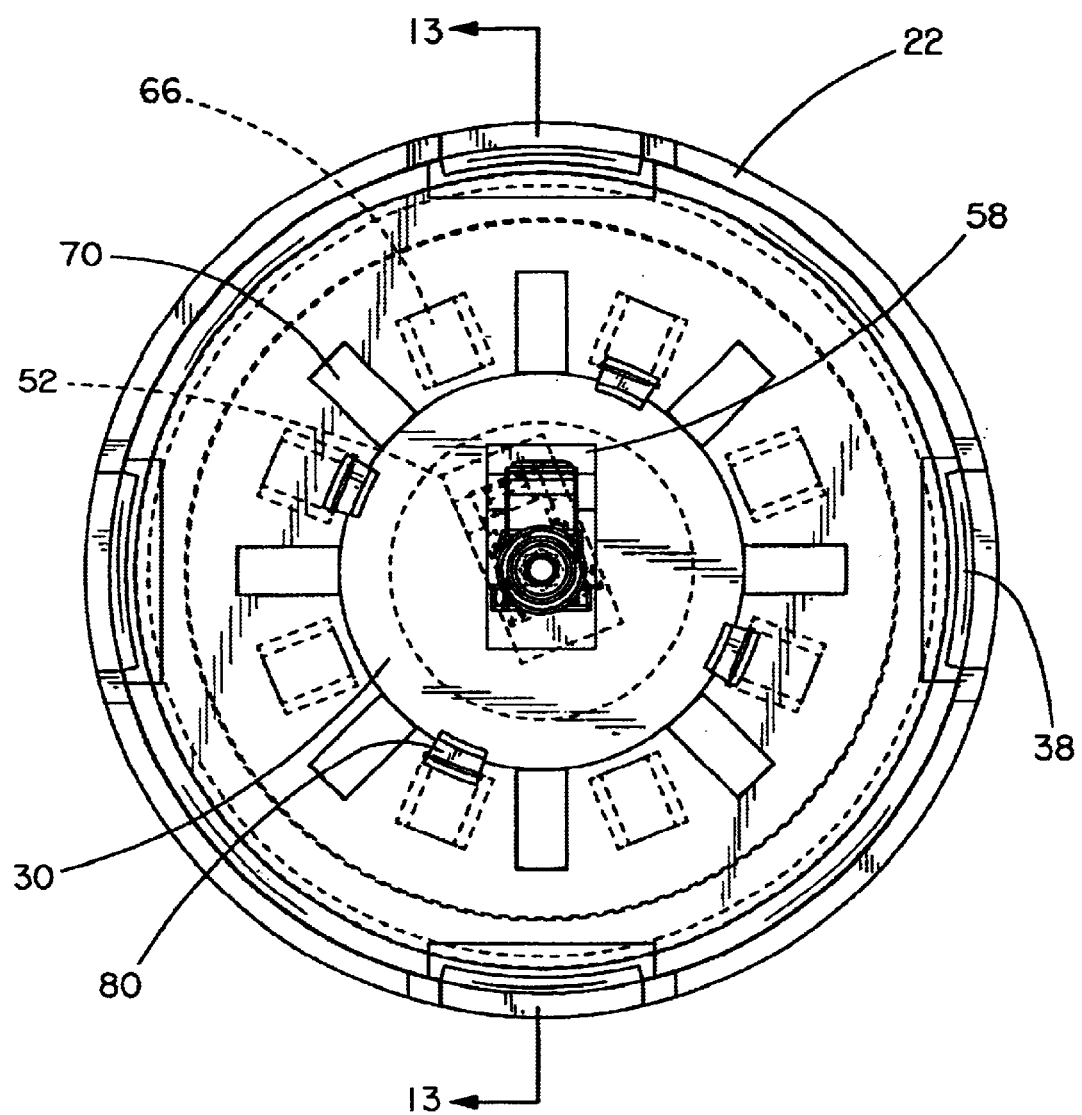
FIG. 12 is an end view of the tuning tool of FIG. 3, as a first adapter is being rotated clockwise.
Figure 13:
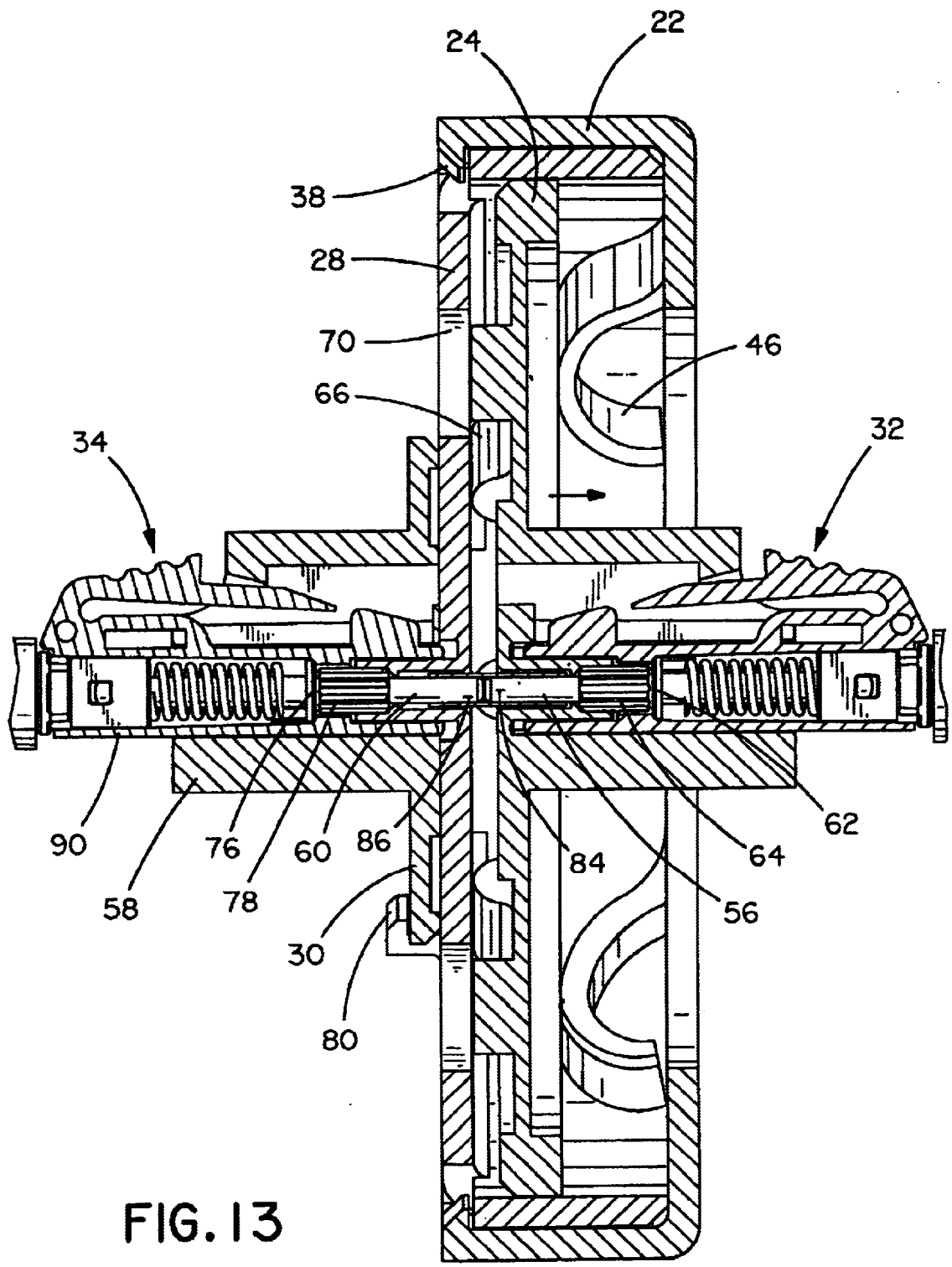
FIG. 13 is a cross-sectional view taken along lines 13—13 of FIG. 12.

As shown in FIGS. 10 and 11, prior to tuning, the first and second ferrule holders 62, 76 are positioned similarly in the first and second adapters 52, 58, respectively. While holding the outer housing 22 on one side of the tuning tool 20 and the first adapter 52 on the other side of the tuning tool 20, the user pulls the first plug tuning disk 24 outward to separate the first plug tuning disk 24 and the inner housing 28, and rotates the first plug tuning disk 24 45° by twisting the first adapter 52 and the outer housing 22 at the same time clockwise. FIG. 12 shows an end view of the tuning tool 20, as the first connector 32 is being rotated clockwise in the first adapter 52. As shown in FIG. 13, the pulling and twisting action separates the two end faces of the mated connector pair and, thus, disengages the detent ribs 66 from the detent pockets 70. At 45° from the reference position, the user measures the insertion loss of the mated connector pair. This step is repeated three times in the clockwise direction, until the user has recorded insertion loss measurements from the reference position to a position 180° clockwise from the reference position.

The user rotates the tuning tool 20 counterclockwise to the reference position. The user then rotates the first plug tuning disk 24 45° in a counterclockwise direction and measures the insertion loss of the mated connector pair. This step is repeated three times in the counterclockwise direction, until the user has recorded insertion loss measurements from the reference position to a position 180° counterclockwise from the reference position. It is likewise contemplated that the user may rotate the first plug tuning disk 24 at 45° increments in a clockwise or counterclockwise direction from the reference point to a point 360° from the reference point. However, rotating the mated connector pair 360° in the same direction increases the likelihood that the cable received in the connector pair could be damaged.

Figure 14:
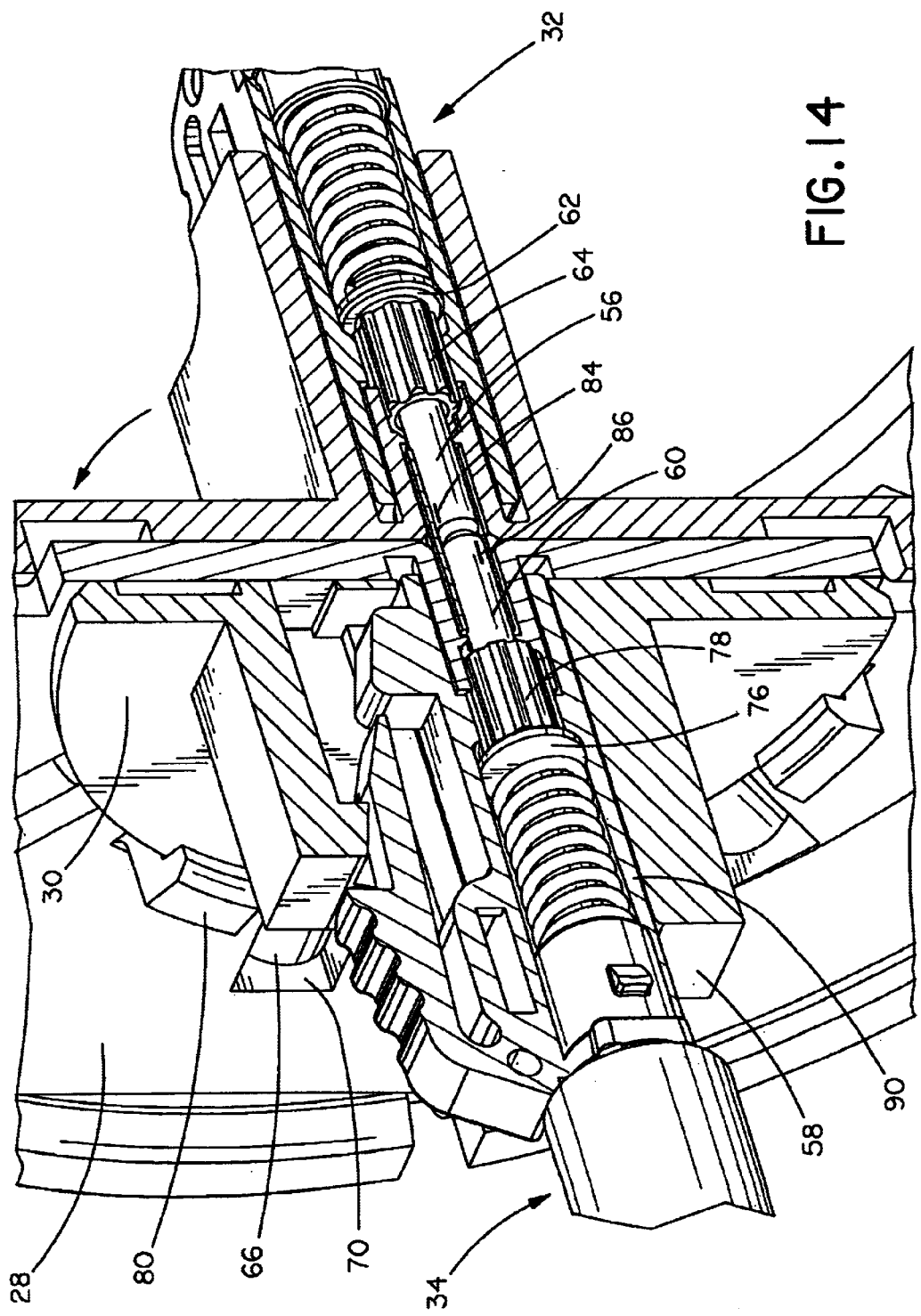
FIG. 14 is a partial cross-sectional view of the tuning tool of FIG. 3, after two connectors are rotated to their optimal alignment position.

As shown in FIG. 14, the mated connector pair is rotated to its optimal alignment position. At this position, the first ferrule mark 84 is no longer aligned with the second ferrule mark 86. As shown in FIG. 15, while holding onto the first adapter 52 and the second adapter 58, the user then rotates the second adapter 58 to align with the first adapter 52. Rotating the second adapter 58 causes tuning arms 88 (see FIG. 10) in the second connector housing 90 to flex and follow the spline contour of the second ferrule holder 76 and, thus, allows the second connector housing 90 to rotate around the second ferrule holder 76. Accordingly, the second ferrule 60 will remain in a fixed position when the second adapter 58 is rotated to align with the first adapter 52. Upon aligning the first and second adapters 52, 58, the mated connector pair has now been tuned to each other and can be removed from the tuning tool 20. As shown in FIG. 16, the optical fiber cores of the first and second ferrules 56, 60 are aligned when the mated connector pair is in its optimal alignment position.

The disclosed invention provides a tuning tool for tuning a fiber optic connector. The tuning tool includes eight detent ribs and eight detent pockets spaced 45° apart around the interior of the tuning tool, to allow rotation and insertion loss measurement at 45° increments.

It should be noted that the above-described and illustrated embodiments and preferred embodiments of the invention are not an exhaustive listing of the forms such a tuning tool in accordance with the invention might take; rather, they serve as exemplary and illustrative of embodiments of the invention as presently understood. By way of example, and without limitation, a tuning tool having more than eight detent ribs and eight detent pockets to allow rotation and insertion loss measurement at less than 45° increments is contemplated to be within the scope of the invention. Many other forms of the invention are believed to exist.

What is claimed is:

1. A tuning tool for tuning a fiber optic connector comprising:
   an outer housing having an aperture therein;
   a first plug tuning disk having a first spline socket and a first adapter extending from a first side thereof, wherein the first adapter extends through the aperture and receives a first ferrule of a first connector therein;
   an inner housing received within the outer housing, wherein the inner housing has a second spline socket extending from a first side thereof;
   a second plug tuning disk received within the first side of the inner housing, the second plug tuning disk having a second adapter extending from a first side thereof to receive a second ferrule of a second connector therein; and
   a split sleeve receivable within the first adapter and the second adapter for receiving the first ferrule and the second ferrule, respectively.

2. The tuning tool of claim 1 wherein the outer housing has four snap latches for engaging four pockets on the inner housing.

3. The tuning tool of claim 2 wherein upon engagement of the snap latches in the pockets, the first plug tuning disk and the inner housing are fixed in the same orientation.

4. The tuning tool of claim 2 wherein upon engagement of the snap latches in the pockets, the inner housing is keyed to the outer housing.

5. The tuning tool of claim 2 wherein the outer housing has four spring latches, each spring latch having two relieves for allowing the snap latches to flex and lock into the pockets.

6. The tuning tool of claim 1 wherein the outer housing has at least three spring fingers for applying a force to facilitate engagement of the first plug tuning disk with the inner housing.

7. The tuning tool of claim 6 wherein the first plug tuning disk has a rim face for slidingly engaging the spring fingers.

8. The tuning tool of claim 1 wherein the first spline socket receives a first ferrule holder having a plurality of splines when the first connector is mated in the first adapter.

9. The tuning tool of claim 8 wherein the first spline socket maintains the orientation of the first ferrule holder in the first adapter during tuning.

10. The tuning tool of claim 1 wherein the first plug tuning disk has eight detent ribs for engaging eight detent pockets in the inner housing.

11. The tuning tool of claim 10 wherein the eight detent pockets and the eight detent ribs allow rotating the first and second connectors at 45 degree increments to determine their optimal alignment position.

12. The tuning tool of claim 1 wherein the second spline socket receives a second ferrule holder having a plurality of splines when the second connector is mated in the second adapter.

13. The tuning tool of claim 12 wherein the inner housing maintains the orientation of the second ferrule holder in the second adapter during tuning.

14. The tuning tool of claim 1 wherein the inner housing has four snap latches for securing the second plug tuning disk to the inner housing.

15. A method of tuning a fiber optic connector comprising the steps of:
   providing a tuning tool having an outer housing, a first plug tuning disk having a first spline socket and a first adapter, an inner housing received within the outer housing, wherein the inner housing has a second spline socket, a second plug tuning disk received within the inner housing, the second plug tuning disk having a second adapter, and a split sleeve receivable within the first adapter and the second adapter for receiving a first ferrule and a second ferrule, respectively;
   positioning a first connector in the first adapter and a second connector in the second adapter to create a mated connector pair inside the tuning tool;
   aligning the second adapter to the first adapter to create a reference position;
   measuring insertion loss of the connector pair at the reference position;
   rotating the first plug tuning disk 45 degrees in a first direction and measuring insertion loss of the connector pair;
   repeating the step of rotating and measuring in the first direction three times;
   rotating the tuning tool in a second direction to the reference position;
   rotating the first plug tuning disk 45 degrees in the second direction and measuring insertion loss of the connector pair;
   repeating the step of rotating and measuring in the second direction three times;

rotating the connector pair to its optimal performance position; and rotating the second adapter to align with the first adapter to tune the connector pair.

16. A tuning tool for tuning a fiber optic connector comprising:

an outer housing having an aperture therein;

a first plug tuning disc having a first adapter extending from a first side thereof, wherein the first adapter extends through the aperture and receives a first ferrule of a first connector therein;

an inner housing received within the outer housing;

a second plug tuning disc received within the inner housing, the second plug tuning disc having a second adapter extending from a first side thereof to receive a second ferrule of a second connector therein; and a split sleeve receivable within the first adapter and the second adapter for receiving the first ferrule and the second ferrule, respectively, wherein the first connector and the second connector form a mated connector pair inside the tuning tool, the tuning tool capable of tuning the connector pair without removing the connector pair from the tuning tool.

* * * * *